United States Patent
Greenberg et al.

(10) Patent No.: US 12,423,762 B2
(45) Date of Patent: ***Sep. 23, 2025

(54) CROWDSOURCED INFORMATICS FOR HORTICULTURAL WORKFLOW AND EXCHANGE

(71) Applicant: iUNU, Inc., Seattle, WA (US)

(72) Inventors: Adam Phillip Takla Greenberg, Seattle, WA (US); Ethan Victor Takla, Seattle, WA (US); Matthew Charles King, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,047

(22) Filed: Aug. 7, 2023

(65) Prior Publication Data
US 2023/0377061 A1    Nov. 23, 2023

Related U.S. Application Data

(63) Continuation of application No. 16/830,111, filed on Mar. 25, 2020, now Pat. No. 11,720,980.

(51) Int. Cl.
*G06Q 30/0601* (2023.01)
*A01G 9/24* (2006.01)
(Continued)

(52) U.S. Cl.
CPC ............ *G06Q 50/02* (2013.01); *A01G 9/247* (2013.01); *A01G 9/249* (2019.05); *A01G 24/00* (2018.02);
(Continued)

(58) Field of Classification Search
None
See application file for complete search history.

(56) References Cited

U.S. PATENT DOCUMENTS

| 5,841,883 A | 11/1998 | Kono et al. |
| 7,013,284 B2 | 3/2006 | Guyan et al. |

(Continued)

FOREIGN PATENT DOCUMENTS

| CA | 3037004 A1 | 3/2018 |
| CA | 3038966 A1 | 3/2018 |

(Continued)

OTHER PUBLICATIONS

U.S. Appl. No. 16/859,891, filed Apr. 27, 2020, Adam Phillip Takla Greenberg.

(Continued)

*Primary Examiner* — Romain Jeanty
(74) *Attorney, Agent, or Firm* — Conley Rose, P.C.

(57) ABSTRACT

Infrastructure and methods to implement a platform for a horticultural operation are disclosed. Sensor data is received from one or more sensors configured to capture data for plants within a plant growth operation. Accumulated data associated with other plants in other plant growth operations is access. The data is analyzed to determine conditions of the plants within the plant growth operation. Plant grower actions to improve plant growth are determined. Instructions are transmitted to a controller device associated with the plant growth operation. Agricultural products or services associated with the plant grower actions are determined. An agricultural exchange service processes electronic commerce information from servicers of the products or services. Bids from the servicers are received, and selection and fulfillment of the bids are facilitated.

20 Claims, 8 Drawing Sheets

(51) Int. Cl.

| | | |
|---|---|---|
| A01G 24/00 | (2018.01) | |
| G06N 5/04 | (2023.01) | |
| G06N 20/00 | (2019.01) | |
| G06Q 10/0639 | (2023.01) | |
| G06Q 30/08 | (2012.01) | |
| G06Q 50/02 | (2012.01) | |

(52) U.S. Cl.
CPC ............... *G06N 5/04* (2013.01); *G06N 20/00* (2019.01); *G06Q 10/06395* (2013.01); *G06Q 30/0605* (2013.01); *G06Q 30/0631* (2013.01); *G06Q 30/08* (2013.01)

(56) References Cited

U.S. PATENT DOCUMENTS

| | | | |
|---|---|---|---|
| 7,184,846 B2 | 2/2007 | Albright et al. | |
| 7,711,576 B1 | 5/2010 | Duett et al. | |
| 8,145,330 B2 | 3/2012 | Emoto | |
| 8,249,926 B2 | 8/2012 | Avey et al. | |
| 8,594,375 B1 | 11/2013 | Padwick | |
| 8,613,158 B2 | 12/2013 | Conrad | |
| 8,850,742 B2 | 10/2014 | Dubé | |
| 9,565,812 B2 | 2/2017 | Wilson | |
| 9,603,316 B1 | 3/2017 | Mansey et al. | |
| 9,779,442 B1 | 10/2017 | Cimic et al. | |
| 10,002,375 B1 | 6/2018 | Scythes et al. | |
| 10,339,380 B2 | 7/2019 | Greenberg et al. | |
| 10,635,274 B2 | 4/2020 | Greenberg et al. | |
| 10,791,037 B2 | 9/2020 | Greenberg et al. | |
| 11,062,516 B2 | 7/2021 | Greenberg et al. | |
| 11,244,398 B2 | 2/2022 | Greenberg et al. | |
| 11,347,384 B2 | 5/2022 | Greenberg et al. | |
| 11,411,841 B2 | 8/2022 | Greenberg et al. | |
| 2002/0082982 A1 | 6/2002 | Mock et al. | |
| 2003/0227487 A1 | 12/2003 | Hugh | |
| 2004/0231240 A1 | 11/2004 | Kuiper et al. | |
| 2005/0072862 A1 | 4/2005 | Skinner | |
| 2006/0196116 A1 | 9/2006 | Zettl | |
| 2007/0065857 A1 | 3/2007 | Glaser et al. | |
| 2007/0179854 A1 | 8/2007 | Ziv et al. | |
| 2007/0220808 A1* | 9/2007 | Kaprielian | A01G 27/003 47/48.5 |
| 2007/0289207 A1 | 12/2007 | May et al. | |
| 2008/0066072 A1 | 3/2008 | Yurekli et al. | |
| 2009/0005247 A1 | 1/2009 | Spiegel et al. | |
| 2009/0112789 A1 | 4/2009 | Oliveira et al. | |
| 2009/0132543 A1 | 5/2009 | Chatley et al. | |
| 2009/0144284 A1 | 6/2009 | Chatley et al. | |
| 2009/0164741 A1 | 6/2009 | Takaki | |
| 2010/0268562 A1* | 10/2010 | Anderson | G06Q 10/06313 705/7.25 |
| 2010/0268679 A1* | 10/2010 | Anderson | G06N 5/02 706/46 |
| 2010/0305966 A1 | 12/2010 | Coulter et al. | |
| 2011/0047636 A1 | 2/2011 | Stachon et al. | |
| 2011/0090960 A1 | 4/2011 | Leontaris et al. | |
| 2011/0137757 A1 | 6/2011 | Paolini et al. | |
| 2011/0196710 A1 | 8/2011 | Rao | |
| 2012/0003728 A1 | 1/2012 | Lanoue et al. | |
| 2012/0109387 A1 | 5/2012 | Martin et al. | |
| 2012/0249741 A1 | 10/2012 | Maciocci et al. | |
| 2013/0006401 A1* | 1/2013 | Shan | H05B 45/20 700/90 |
| 2013/0185108 A1 | 7/2013 | Bainbridge et al. | |
| 2013/0191836 A1 | 7/2013 | Meyer | |
| 2013/0235183 A1 | 9/2013 | Redden | |
| 2013/0332205 A1 | 12/2013 | Friedberg et al. | |
| 2014/0026474 A1 | 1/2014 | Kulas | |
| 2014/0035752 A1 | 2/2014 | Johnson | |
| 2014/0115958 A1 | 5/2014 | Helene et al. | |
| 2014/0154729 A1 | 6/2014 | Leyns et al. | |
| 2014/0168412 A1 | 6/2014 | Shulman et al. | |
| 2014/0176688 A1 | 6/2014 | Ibamoto | |
| 2014/0200690 A1 | 7/2014 | Kumar | |
| 2014/0288850 A1 | 9/2014 | Avigdor et al. | |
| 2014/0324490 A1 | 10/2014 | Gurin | |
| 2015/0015697 A1 | 1/2015 | Redden et al. | |
| 2015/0026092 A1 | 1/2015 | Abboud et al. | |
| 2015/0120349 A1 | 4/2015 | Weiss | |
| 2015/0131867 A1 | 5/2015 | Lin et al. | |
| 2015/0185995 A1 | 7/2015 | Shoemaker et al. | |
| 2015/0227707 A1 | 8/2015 | Laws et al. | |
| 2015/0230409 A1 | 8/2015 | Nicole et al. | |
| 2015/0261803 A1 | 9/2015 | Song et al. | |
| 2015/0286897 A1 | 10/2015 | Spaith | |
| 2015/0295877 A1 | 10/2015 | Roman | |
| 2015/0356721 A1 | 12/2015 | Li et al. | |
| 2015/0370935 A1 | 12/2015 | Starr | |
| 2016/0026940 A1 | 1/2016 | Johnson | |
| 2016/0050840 A1 | 2/2016 | Sauder et al. | |
| 2016/0050862 A1 | 2/2016 | Walliser | |
| 2016/0086032 A1 | 3/2016 | Pickett | |
| 2016/0127599 A1 | 5/2016 | Medicherla et al. | |
| 2016/0140868 A1 | 5/2016 | Lovett et al. | |
| 2016/0148104 A1 | 5/2016 | Itzhaky et al. | |
| 2016/0205872 A1 | 7/2016 | Chan et al. | |
| 2016/0216245 A1 | 7/2016 | Sutton | |
| 2016/0239709 A1 | 8/2016 | Shriver | |
| 2016/0278300 A1 | 9/2016 | Clendinning et al. | |
| 2016/0302351 A1 | 10/2016 | Schildroth et al. | |
| 2016/0345517 A1 | 12/2016 | Cohen et al. | |
| 2016/0360712 A1* | 12/2016 | Yorio | A01G 31/06 |
| 2016/0371830 A1* | 12/2016 | Barrasso | H05B 45/20 |
| 2017/0030877 A1 | 2/2017 | Miresmailli et al. | |
| 2017/0038749 A1 | 2/2017 | Mewes et al. | |
| 2017/0039657 A1 | 2/2017 | Honda et al. | |
| 2017/0064912 A1 | 3/2017 | Tabakman | |
| 2017/0068924 A1 | 3/2017 | Tanaka et al. | |
| 2017/0250751 A1 | 8/2017 | Kargieman et al. | |
| 2017/0286772 A1 | 10/2017 | Workman et al. | |
| 2017/0300846 A1 | 10/2017 | Harwood | |
| 2017/0374323 A1 | 12/2017 | Gornik | |
| 2018/0014452 A1 | 1/2018 | Starr | |
| 2018/0039261 A1 | 2/2018 | Haller et al. | |
| 2018/0041545 A1 | 2/2018 | Chakra et al. | |
| 2018/0052637 A1 | 2/2018 | Chen | |
| 2018/0082362 A1 | 3/2018 | Greenberg et al. | |
| 2018/0083844 A1 | 3/2018 | Greenberg et al. | |
| 2018/0276504 A1 | 9/2018 | Yamaguchi et al. | |
| 2018/0325051 A1 | 11/2018 | Brandao et al. | |
| 2019/0034736 A1 | 1/2019 | Bisberg et al. | |
| 2019/0212316 A1 | 7/2019 | Sutton | |
| 2019/0220964 A1 | 7/2019 | Mello | |
| 2019/0244428 A1* | 8/2019 | Greenberg | G06T 7/001 |
| 2019/0284567 A1 | 9/2019 | Reynolds et al. | |
| 2020/0264759 A1 | 8/2020 | Greenberg et al. | |
| 2021/0304513 A1 | 9/2021 | Greenberg et al. | |
| 2021/0307259 A1 | 10/2021 | Setlur et al. | |
| 2022/0108403 A1 | 4/2022 | Greenberg et al. | |

FOREIGN PATENT DOCUMENTS

| | | | |
|---|---|---|---|
| CA | 3089725 C | 6/2022 | |
| EP | 2736318 A1 | 6/2014 | |
| EP | 3491613 A4 | 1/2020 | |
| EP | 3491470 A4 | 3/2020 | |
| JP | 2011103870 A | 6/2011 | |
| KR | 20130005540 A | 1/2013 | |
| KR | 20140077513 A | 6/2014 | |
| KR | 20140114089 A | 9/2014 | |
| KR | 20150000435 A | 1/2015 | |
| KR | 20150000435 U | 1/2015 | |
| KR | 1020190004978 A | 1/2019 | |
| WO | WO-0054572 A1 * | 9/2000 | ........... A01G 9/0295 |
| WO | 2011115666 A2 | 9/2011 | |
| WO | WO-2014060715 A2 * | 4/2014 | ............... A01C 1/02 |
| WO | 2014100502 A1 | 6/2014 | |
| WO | WO-2017176627 A1 * | 10/2017 | ............. A01G 22/00 |
| WO | 2018057796 A1 | 3/2018 | |

(56) References Cited

FOREIGN PATENT DOCUMENTS

| WO | 2018057799 A1 | 3/2018 |
|---|---|---|
| WO | 2019157107 A1 | 8/2019 |

OTHER PUBLICATIONS

Augustin et al., "A framework for the extration of quantitative traits from 2D images of mature *Arabidopsis thaliana*," Machine Vision and Applications, vol. 27, Issue 5 (Oct. 16, 2015), pp. 647-661.
Canadian Patent Application No. 3,089,725 Office Acton mailed Aug. 18, 2021, 5 pages.
European Patent Application No. 17853932.6, Extended European Search Report mailed Feb. 21, 2020, 12 pages.
European Patent Application No. 17853932.6, Office Action mailed Dec. 16, 2021, 7 pages.
European Patent Application No. 17853934.2, Extended European Search Report mailed Dec. 13, 2019, 10 pages.
European Patent Application No. 17853934.2, Office Action mailed Dec. 9, 2021, 8 pages.
European Patent Application No. 17853934.2, Office Action mailed Dec. 11, 2020, 7 pages.
International Application No. PCT/US2017/052800, International Search Report and Written Opinion mailed Jan. 16, 2018, 14 pages.
International Application No. PCT/US2017/052805, International Search Report and Written Opinion mailed Jan. 9, 2018, 14 pages.
International Application No. PCT/US2019/016927, International Search Report and Written Opinion mailed May 7, 2019, 9 pages.
International Application No. PCT/US2021/023301, International Search Report and Written Opinion mailed Jul. 12, 2021, 10 pages.
International Patent Application No. PCT/US2021/023301 Written Opinion mailed Jul. 12, 2021, 5 pages.
International Search Report and Written Opinion for PCT Application No. PCT/US2017/052800 dated Jan. 16, 2018, 14 pages.
International Search Report and Written Opinion for PCT Application No. PCT/US2017/052805 dated Jan. 9, 2018, 14 pages.
Jean Angeles et al. AR Plants: Herbal Plant Mobile Application utilizing Augmented Reality. Dec. 2017. [retrieved on Apr. 1, 2019]. Retrieved from the Internet:. entire document.
Marco Augustin et al., 'A framework for the extration of quantitative traits from 2D images of mature *Arabidopsis thaliana*', Oct. 16, 2015 (https://link.springer.ocm/article/10.1007/s00138-015-0720-z) See abstract; and sections 3-4.
Markus Funk et al: "Interactive worker assistance", Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI: 10.1145/2971648.2971706 ISBN: 978-1-4503-4461-6.
Nonami et al "Environmental Control for Plant Growth in Plant Factory Operation and Greenhouse Management From Physiological Viewpoint", IFAC Mathematical and Control Applications in Agriculture and Horticulture, pp. 125-130. (Year: 1991).
Qing Yao et al: "Application of Support 1-15 Vector Machine for Detecting Rice Diseases Using Shape and Color Texture Features", Engineering Computation, 2009. ICEC 109. International Conference on, IEEE, Piscataway, NJ, USA, May 2, 2009 (May 2, 2009), pp. 79-83, XP031491490,ISBN: 978-0-7695-3655-2 * the whole document*.
Restriction Requirement (U.S. Appl. No. 15/271,749), dated Mar. 7, 19, 6 pages.
S Nagasai et al.: "Plant Disease Identification using Segmentation Techniques" , International Journal of Advanced Research in Computer and Communication Engineering, vol. 4, No. 9, Sep. 1, 2015 (Sep. 1, 2015), XP55500057, DOI: 10.17148/IJARCCE.2015.4988.
S. Nagasai, et al., 'Plant Disease Identification using Segmentation Techniques', In: International Journal of Advanced Research in Computer and Communication Engineering, Oct. 5, 2015, vol. 4, Issue 9, ISSN (Online) 2278-1021 (https://www.ijarcce.com/upload/2015/September-15/?C=N;O=A) See abstract; and pp. 411-412.
S. Nagasai, S. Jhansi Rani, Plant Disease Identification using Segmentation Techniques, Sep. 2015, International Journal of Advanced Research in Computer and Communication Engineering, vol. 4, Issue 9, pp. 411-413. (Year: 2015).
Sagar Patil et al., "A Survey on Methods of Plant Disease Detection," International Journal of Science and Research (IJSR), 2015, vol. 4, Issue 2, ISSN (Online): 2319-7064.
Sagar Patil et al: "A Survey on Methods of Plant Disease Detection", International Journal of Science and Research, vo 1. 4, No. 2, Feb. 1, 2015 (Feb. 1, 2015), pp. 1392-1396, XP55500036.
Sanjeev S. Sannakki et al., "Comparison of Difference Leaf Edge Detection Algorithms Using Fuzzy Mathematical Morphology," International Journal of Innovations in Engineering and Technology (IJIET), 2012, vol. 1, Issue 2, ISSN: 2319-1058.
Sannakki et al., "Comparison of Difference Leaf Edge Detection Algorithms Using Fuzzy Mathematical Morphology," International Journal of Innovations in Engineering and Technology (IJIET), vol. 1, Issue 2 (Aug. 2012), pp. 15-21.
U.S. Appl. No. 15/271,569, Final Office Action mailed Apr. 24, 2018, 18 pages.
U.S. Appl. No. 15/271,569, Non-Final Office Action mailed Jan. 23, 2018, 33 pages.
U.S. Appl. No. 15/271,569, Notice of Allowance, mailed Mar. 11, 2019, 21 pages.
U.S. Appl. No. 15/271,630, Corrected Notice of Allowability, Jan. 23, 2020, 9 pages.
U.S. Appl. No. 15/271,630, Final Office Action mailed Apr. 17, 2019, 11 pages.
U.S. Appl. No. 15/271,630, Non-Final Office Action mailed Sep. 26, 2018, 18 pages.
U.S. Appl. No. 15/271,630, Notice of Allowance, Mailed Jan. 15, 2020, 18 pages.
U.S. Appl. No. 15/271,630, Notice of Allowance, Mailed Nov. 20, 2019, 22 pages.
U.S. Appl. No. 15/271,658, Final Office Action mailed Jul. 29, 2019, 31 pages.
U.S. Appl. No. 15/271,658, Non Final Office Action mailed Jan. 8, 2020, 36 pages.
U.S. Appl. No. 15/271,658, Non-Final Office Action mailed Sep. 19, 2018, 8 pages.
U.S. Appl. No. 15/271,658, Notice of Allowance mailed May 5, 2020, 47 pages.
U.S. Appl. No. 15/271,727, Final Office Action mailed Nov. 2, 2020, 36 pages.
U.S. Appl. No. 15/271,727, Final Office Action mailed Apr. 25, 2019, 36 pages.
U.S. Appl. No. 15/271,727, Non Final Office Action mailed Feb. 4, 2020, 62 pages.
U.S. Appl. No. 15/271,727, Non-Final Office Action mailed Oct. 2, 2018, 22 pages.
U.S. Appl. No. 15/271,727, Notice of Allowance mailed Aug. 13, 2021, 130 pages.
U.S. Appl. No. 15/271,749, Final Office Action mailed Mar. 16, 2020, 52 pages.
U.S. Appl. No. 15/271,749, Final Office Action mailed Jun. 30, 2021, 86 pages.
U.S. Appl. No. 15/271,749, Non Final Office Action mailed Oct. 16, 2019, 58 pages.
U.S. Appl. No. 15/271,749, Notice of Allowance mailed Sep. 1, 2022, 739 pages.
U.S. Appl. No. 15/271,749, Notice of Allowance mailed May 18, 2022, 417 pages.
U.S. Appl. No. 15/271,749, Notice of Allowance mailed Mar. 23, 2022, 214 pages.
U.S. Appl. No. 15/271,749, Notice of Allowance mailed Feb. 24, 2022, 139 pages.
U.S. Appl. No. 15/271,749, Office Action mailed Sep. 11, 2020, 63 pages.
U.S. Appl. No. 15/891,110, Final Office Action mailed May 1, 2020, 31 pages.
U.S. Appl. No. 15/891,110, Final Office Action mailed Dec. 17, 2018, 13 pages.

(56) References Cited

OTHER PUBLICATIONS

U.S. Appl. No. 15/891,110, Non Final Office Action mailed Oct. 24, 2019, 32 pages.
U.S. Appl. No. 15/891,110, Non-Final Office Action mailed Jul. 13, 2018, 15 pages.
U.S. Appl. No. 15/891,110, Notice of Allowance mailed Dec. 2, 2020, 17 pages.
U.S. Appl. No. 15/891,110, Notice of Allowance mailed Feb. 18, 2021, 17 pages.
U.S. Appl. No. 15/891,110, Notice of Allowance mailed Mar. 18, 2021, 16 pages.
U.S. Appl. No. 15/891,110, Office Action mailed Aug. 26, 2020, 13 pages.
U.S. Appl. No. 16/830,111, Corrected Notice of Allowability mailed Feb. 15, 2023, 22 pages.
U.S. Appl. No. 16/830,111, Notice of Allowance mailed Nov. 2, 2022, 47 pages.
U.S. Appl. No. 16/830,111, Notice of Allowance mailed Jul. 13, 2022, 29 pages.
U.S. Appl. No. 16/830,111, Notice of Allowance mailed Mar. 13, 2023, 25 pages.
U.S. Appl. No. 16/830,111, Office Action mailed Jan. 18, 2022, 24 pages.
U.S. Appl. No. 16/859,891, Final Office Action mailed Feb. 19, 2021, 32 pages.
U.S. Appl. No. 16/859,891, Final Office Action mailed May 27, 2021, 24 pages.
U.S. Appl. No. 16/859,891, Notice of Allowance mailed Dec. 29, 2021, 16 pages.
U.S. Appl. No. 16/859,891, Office Action mailed Sep. 14, 2020, 40 pages.
U.S. Appl. No. 16/998,925, Notice of Allowance mailed Apr. 5, 2022, 83 pages.
U.S. Appl. No. 16/998,925, Office Action mailed Nov. 23, 2021, 100 pages.
U.S. Appl. No. 17/347,343, Office Action mailed Aug. 2, 2022, 45 pages.
U.S. Appl. No. 17/959,236 Office Action mailed Jan. 27, 2023, 1448 pages.
U.S. Appl. No. 17/959,240 Office Action mailed Feb. 1, 2023, 1495 pages.
Vaglica, "Shrub Pruning Dos and Donts", Aug. 3, 2016, https://www.thisoldhouse.com/ideas/shrub-pruning-dos-and-donts (Year: 2016).
White "The Growing Business of Cover Crops", Aug. 2014, National Wild Life Federation, pp. 1-27 (Year: 2014).

\* cited by examiner

CROWDSOURCED INFORMATICS FOR HORTICULTURAL WORKFLOW AND EXCHANGE

CROSS REFERENCE TO RELATED APPLICATION

This application is a continuation of U.S. application Ser. No. 16/830,111, filed on Mar. 25, 2020, which is incorporated by reference.

BACKGROUND

In order to successfully carry out a horticultural operation, information is collected about the horticultural operation in order to ensure successful growth and to identify any problems with the operation. Modern industrial horticultural operations may involve hundreds or thousands of plants under a plurality of conditions, in greenhouses or fields, and in different geographic locations and local climates. Accordingly, collecting the information needed for a successful horticultural operation can be difficult and costly.

Additionally, horticultural operations may involve multiple personnel with different roles in the operation. For example, growers receive recommendations to use certain agricultural products from a Pest Control Adviser (PCA) and/or agronomist who is responsible for monitoring insects, plant development, soil health, and recommending corrective actions. Agricultural products that are needed by the growers may be provided by agricultural producers and distributed by agricultural distributors.

It is with respect to these and other considerations that the disclosure made herein is presented.

BRIEF DESCRIPTION OF THE DRAWINGS

The Detailed Description is set forth with reference to the accompanying figures.

DETAILED DESCRIPTION

Figure 1:
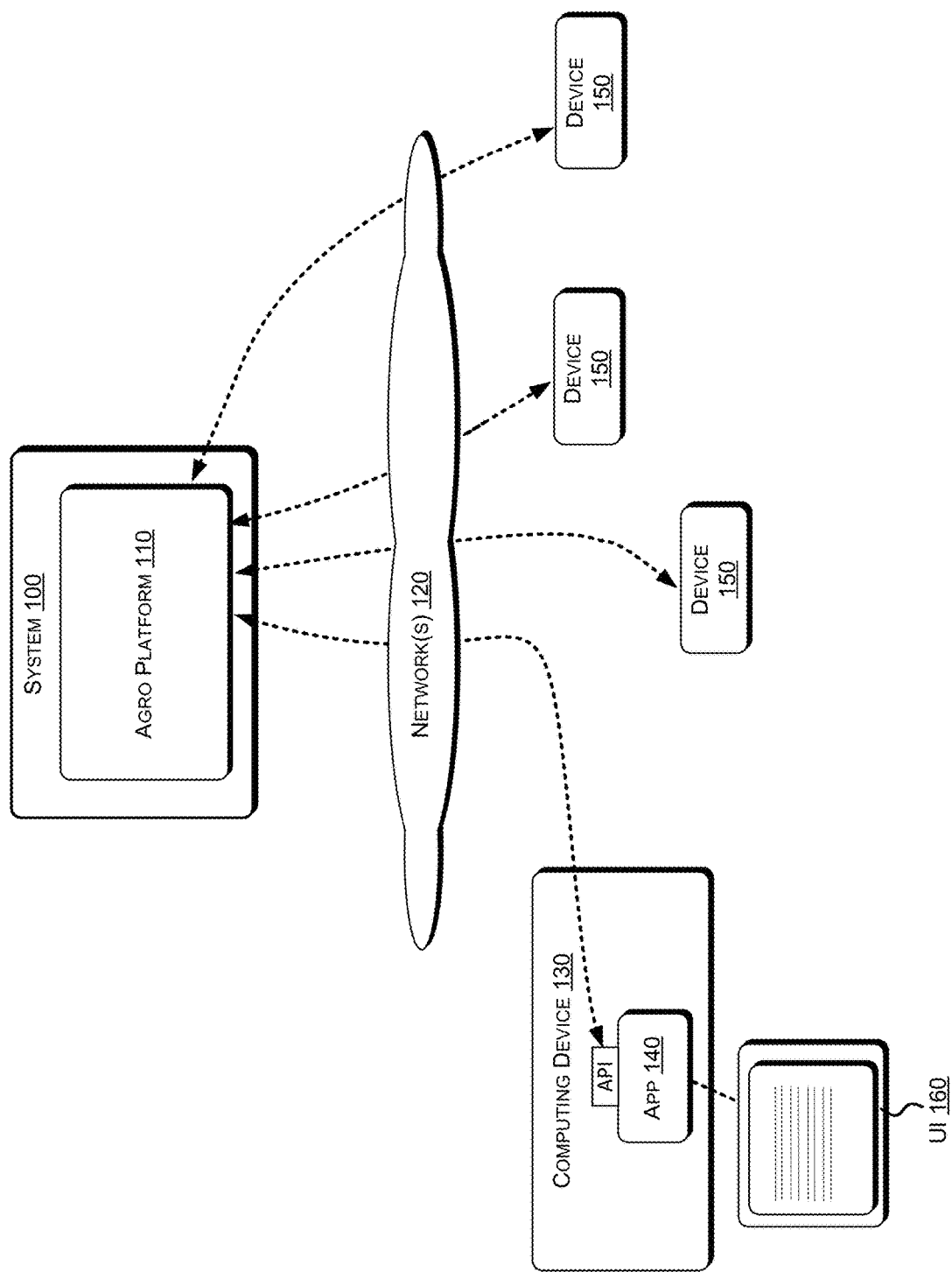
FIG. 1 is a system diagram for horticultural operations.

The environments surrounding different horticultural grow operations can vary widely. A horticultural operation is comprised of a set of plants to be grown (also called a "grow"), a set of processes to plant, grow, maintain, harvest and document the set of plants, and the feedstock including but not limited to seed, plant material, fertilizer, pesticides and the like. Horticultural operations may be indoor in greenhouses, outdoor, may be localized or geographically disparate, and may be automated.

Information collected from grow operations can be of low-fidelity, difficult to associate with the source of information, as well as associate with the plant under test, untimely, and incomplete. Without high-fidelity, reliable, timely, and complete information, and without coordinated data collection, analysis, and remediation, the ability to generate accurate recommendations to farmers/growers for remedial action may be difficult or impossible. Additionally, existing flows of information between PCA/agronomists, agricultural producers, agricultural distributors, and farmers/growers may have inefficiencies that make it difficult for farmers/growers to identify what agricultural products they need and to be GRC compliant and obtain the products at efficient prices. Furthermore, the flows of information may limit the use of sensors, autonomous devices, and other technological innovations by the farmers/growers.

With regard to the roles in horticultural operations, PCA/agronomists are generally licensed, and their recommendations are typically made to satisfy governance/regulatory/compliance concerns. Accordingly, such recommendations may be quite costly. Furthermore, some PCA/agronomists may be employed by the suppliers, which may introduce biases in the recommendations. It is desirable to implement a platform that can provide such recommendations that disintermediate PCA/agronomists or other roles in horticultural operations and enable greater efficiencies and improve recommendations provided to the farmers/growers.

Technologies and techniques provided herein enable the implementation of a platform for collecting and analyzing high-fidelity data from greenhouses or other growing sites. The analysis of the high-fidelity data may enable the platform to generate timely and accurate recommendations for designing new feedstock, mixtures/combinations of existing feedstock, optimizing workflow of an agricultural operation, and continuously modifying and updating the recommendations based on additional data as the data becomes available. In some embodiments, the platform may further be configured to provide product recommendations and implement a bidding platform through which producers and distributors can bid for the lowest price to sell to farmers and growers. Such a platform may be referred to herein as an agro platform, agricultural platform, agricultural exchange, or agricultural exchange service.

The platform may enable the continuous monitoring of a horticultural operation to collect information about the operation, identify problems in the operation, identify solutions to those problems, and generate recommendations for remediation. Furthermore, the collection of high-fidelity data can enable the inclusion of a large number of variables including factors that may vary across location, e.g. people, climate, mechanical problems, and the like, that provide contextual information around plant measurements. In some implementations, high-fidelity data can include data where sampling is performed at least once before any "event of interest." In typical operations, a plant may be imaged once a week. With high-fidelity data, images may be captured several times per day, allowing plant images to be captured between each and every action performed by an agricultural worker. This can enable greater fidelity and accuracy as well as generation of results that were not previously possible.

In one embodiment, individual or groups of plants may be continuously monitored with one or more sensors. For example, one sensor can be an image capture device, such as digital video camera, or a still image digital camera configured to take still images periodically or on some other schedule. The images may be collected and analyzed using object-recognition techniques and computer image analysis techniques to generate information for accurate automated diagnosis and recommendations for remediation. In some embodiments, recommendations may be determined using a machine learning model.

Advantages of such a platform may include the completeness and speed that remediation recommendations may be dispatched to growers. Since the individual plants and their respective environments are being constantly monitored, the platform may enable real-time or near real-time response and monitoring. An additional advantage is the comprehensive collection of data across an entire horticultural operation. The platform may collect information for every plant in a given operation and its environment. Historical information may be retained, enabling the identification of trends over time, comparison to similar plants, and identification of relationships between plants that were not previously identified. A further advantage is that the use of computer analysis may allow for analysis of specific portions of a plant as well as chronological analysis of images over time, enabling diagnostic possibilities that may further inform the recommendation and bidding process.

The platform may further enable a more efficient supply and demand process which may lead to decreased costs for agricultural products, while enabling improved recommendations for agricultural products. For example, more customized recommendations can be generated for a grow, lower costs of feedstock can be optimized, and workflow for agro workers can be optimized, to name a few. The platform may further enable various third parties to participate in the traditional producer distributor PCA/agronomist grower model.

In an embodiment, the platform may be implemented as one or more computing devices that are configured to:

Communicate with one or more sensors (e.g., Image Capture Device (ICD)) that captures data at different grower sites
Receive data from the sensors
Perform analysis of the sensor data
Identify diagnoses based on the analysis
Generate recommendations based on the analysis and diagnoses
Receive proposals for agricultural products
Receive a selection for an agricultural product
Continuously update the analysis using feedback The platform may be configured to provide diagnosis and recommendation information to producers, distributors, PCA/agronomists, growers, or third parties (e.g., researchers and regulators). Producers may use the information to determine which agricultural products to propose to growers, and distributors can use the information to determine which agricultural products to deliver. PCA/agronomists can use the information to determine whether the diagnosis/recommendations are correct or whether modifications are needed. Growers can use the information to determine which recommendations to incorporate, which agricultural product to obtain, recommendations for making a custom feedstock, etc. The recommendations may include, for example, grower methods, feedstock supplies and mixtures, workflow, Lumiere parameters, plant species, and the like. For example, the amount of light plus spectrum and temperature of light may be controlled. The platform may use the high-fidelity data to continuously fine tune and update recommendations for these and other parameters.

The platform can further enable producers and distributors to bid for the lowest price to sell to growers and enable growers to select a proposed bid. The platform thus provides an independent source of analysis and recommendations for growers, while providing an efficient platform that can provide accurate and timely information and enable efficient transactions between the parties.

The platform can be configured to provide interfaces for exchanging information with various other systems and devices at one or more of producers, distributors, PCA/agronomists, growers, as well as other parties. The various parties may interface to the platform using various types of devices including mobile devices to enable continuous and as-needed communications. For example, an online exchange of information "recipes" as well as an online store (similar to an app store) may be implemented. The platform may further implement interfaces that enable additional parties to contribute to or receive data from the platform, such as research facilities, universities, regulatory agencies (e.g., demonstrating compliance with an agricultural compliance plan), and the like. In some embodiments, an application programming interface (API) may be provided to facilitate the servicing of input and output to the platform.

It should be appreciated that the above-described subject matter may be implemented as a computer-controlled apparatus, a computer process, a computing system, or as an article of manufacture such as a computer-readable storage medium. While the examples described herein are illustrated in the context of agricultural processes, it should be understood that the described principles can be implemented with other types of growing processes pertaining to plants and animals. These and various other features will be apparent from a reading of this Detailed Description and a review of the associated drawings. Furthermore, the claimed subject matter is not limited to implementations that solve any or all disadvantages noted in any part of this disclosure.

In the example system illustrated in FIG. 1, a system 100 is illustrated that implements platform 110. The platform 110 may be configured to receive input from and provide information to various devices 150 over a network 120, as well as computing device 130. A user interface 160 may be rendered on computing device 130. The user interface 160 may be provided in conjunction with an application 140 that communicates to the platform 110 using an API via network 120. In some embodiments, system 100 may be configured to provide agricultural information to users. In one example, platform 110 may be configured to receive input from one or more grow operations, analyze the data, and provide recommendations to computing device 130 and various devices 150.

In an embodiment, an agricultural machine learning or cognitive network model may be implemented with a feedback loop to update the recommendations based on currently available data. At least some of this data may be data shared by growers. Growers may be provided an option to opt in/opt out of the system for privacy. In some configurations, the agricultural machine learning model may be configured to utilize supervised, unsupervised, or reinforcement learning techniques to generate diagnoses and recommendations. For example, the agricultural machine learning model may utilize supervised machine learning techniques by training on sensor data and user data as described herein. In some embodiments, the machine learning model may also, or alternatively, utilize unsupervised machine learning techniques to generate diagnoses and recommendations including, but not limited to, a clustering-based model, a forecasting-based model, a smoothing-based model, or another type of unsupervised machine learning model. In some embodiments, the machine learning model may also, or alternatively, utilize reinforcement learning techniques to generate diagnoses and recommendations. For example, the model may be trained using the input data and, based on grower feedback, the model may be rewarded based on its output.

In some embodiments, the agricultural data may be analyzed to identify trends and patterns related to diagnoses and recommendations. For example, diagnoses may be for plant health issues as well as for detrimental workflows. The agricultural data may be analyzed to determine which recommendations may influence grower behavior and interaction, and in some cases, which product diagnoses and recommendations may be related to an increased likelihood of grower behavior such as increasing the likelihood of purchasing a recommended product or modifying a workflow. In one embodiment, the agricultural machine learning model may incorporate a classification function that may be configured to determine which diagnoses and recommendations are relevant for a particular objective, such as optimizing for yield, optimizing for economics, optimizing for a particular plant result (e.g., spotted pink roses), etc. The classification function may, for example, continuously learn which diagnoses and recommendations are relevant to various potential outcomes. In some embodiments, supervised learning may be incorporated where the machine learning model may classify observations made from various sensor data and user data, and potentially from pre-existing information frameworks. The machine learning model may assign metadata to the observations. The metadata may be updated by the machine learning model to update relevance to the objectives of interest, as new observations are made, and assign tags to the new observations. The machine learning model may learn which observations are alike and assign metadata to identify these observations. The machine learning model may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the machine learning model may employ a combination of probabilistic and heuristic methods to guide and narrow the data that are analyzed.

In order to provide relevant results that are more likely to indicate outcomes for a particular observed pattern of data, the most relevant patterns may be identified and weighted. In some embodiments a heuristic model can be used to determine diagnoses and recommendations that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular pattern. Feedback from an initial round of analysis can be used to further refine the initial selection, thus implementing a closed loop system that generates likely candidates for diagnoses and recommendations in situations where programmatic approaches may be impractical or infeasible. As an example, Markov modeling or variations thereof (e.g., hidden Markov model and hierarchical hidden Markov model) can be used in some embodiments to identify candidate diagnoses and recommendations that may otherwise be missed using traditional methods.

In an embodiment, the agricultural machine learning model may be configured to learn the effect of a recommendation on a species under a given set of conditions that exist for a grow operation using a classical or deep reinforcement learning method, supervised learning method, or other machine learning method. A recommendation can include any permutation of a given set of products, treatments, or recipes. Using the deep reinforcement learning path as an example, a "policy" network can be trained to generate potential permutations of products, treatments, or recipes, while a "value" network would be trained to identify the policies that give the grower the best outcome. Used in this way, the machine learning model can, for example, make recommendations to the grower in order to optimize some part of their grow operation, or, in the case of a single product permutation, identify products that have different effects than advertised. The effects of recommendations can be monitored through manual measurements of the growth process, for example through yield of the crop, or in an automated way using measurement devices as described herein. As the system accumulates more automated and manual grower measurements, paired with system recommendations and advertised product effects, the agricultural machine learning model can be continuously improved.

In an embodiment, a grading or quality assessment of selected items in the agricultural marketplace can be provided to a user for a given issue identified by the agricultural machine learning model. For example, if Grower A has fusarium, a list of fusarium treatment products could be recommended, each with a visible quality metric to help the grower make informed purchases. The quality metric may be derived from the agricultural machine learning model's identification of an item on the marketplace to solve a target problem or set of problems based on the prior knowledge of all instances of the use of that product for this type of problem. It should be noted that the quality metric may also be multi-dimensional and convey, for example, the potential for pest infestation, the effect on yield, and the effects on drought-tolerance.

In order to encourage knowledge sharing, users can offer more detailed information for their recipes (e.g., their watering schedule, lighting schedule, temperature zones, fertilizer, etc.), contributing to the global knowledge pool of the system. The users may receive in return recipes that have been built using this global knowledge, thus providing more useful information than any one grower's recipe alone. In some instances, growers may not always use the quality metrics generated by the agricultural machine learning model to select the products they which to purchase. Some growers may opt to use their own expertise to make these decisions, which in turn can provide novel combinations of recipes/species/treatments/products/locations that can be input to the agricultural machine learning model and thus further improving the self-supervised learning process.

Figure 2:
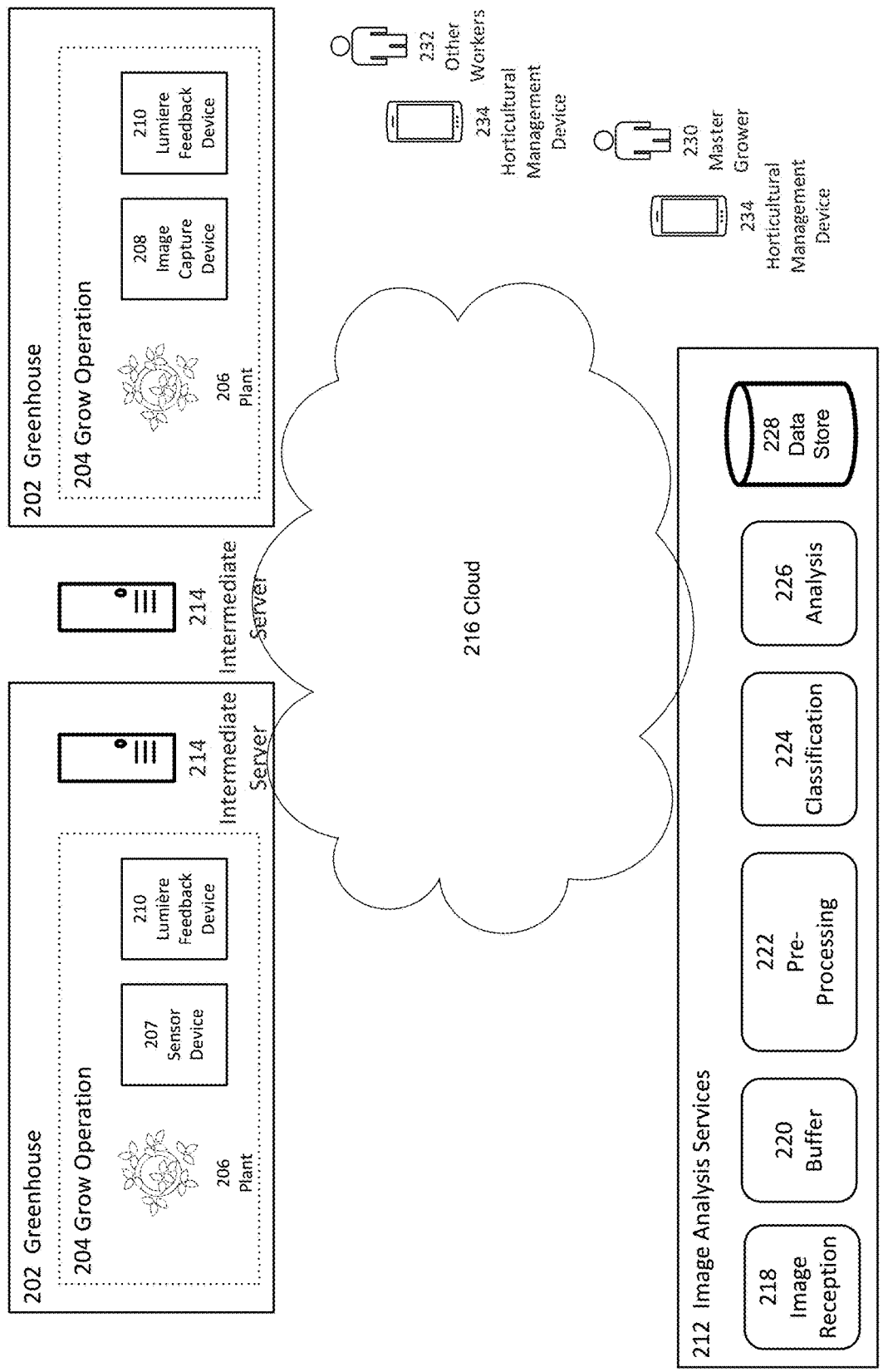
FIG. 2 is a block diagram of an example hardware, software and communications environment for horticultural operation.

FIG. 2A depicts an example of an example horticultural operation 200. Horticultural operation 200 may cover one or more locations, such as greenhouses 202. Greenhouses 202 may also encompass any location or facility where plants are grown such as an open field, a hydroponic operation, and/or so forth.

Greenhouse 202 may have one or more grow operations 204 each with one or more plants 206. A grow operation 204 may include multiple plants in different locations/greenhouses 202. A grow operation 204 may be a logical grouping of plants 206 that are similarly situated such that the cultivation of each plant in the group is substantially similar. Greenhouse 204 may have multiple grow operations, for example, different grow operations for different type of plants. However, each grow operation may also have more than one type of plant under care. Grow operation may also be referred to as horticultural operation.

Information for the plants may be captured with a sensor device 207, which in one example may be an image capture device 208. Each plant 206 may be monitored by at least one image capture device 208. In some embodiments, each individual plant may have a single dedicated image capture device 208. The image capture device may be a digital video camera or may be a still image camera configured to capture images periodically and/or on demand.

Generally, an image capture device 208 may take visible light spectra pictures but may also extend to non-visible spectra such as infrared and ultraviolet. The image capture device 208 may have an on-board application programming interface (API) enabling programmatic control. Alternatively, the image capture device 208 may be networked to enable remote control.

Figure 3:
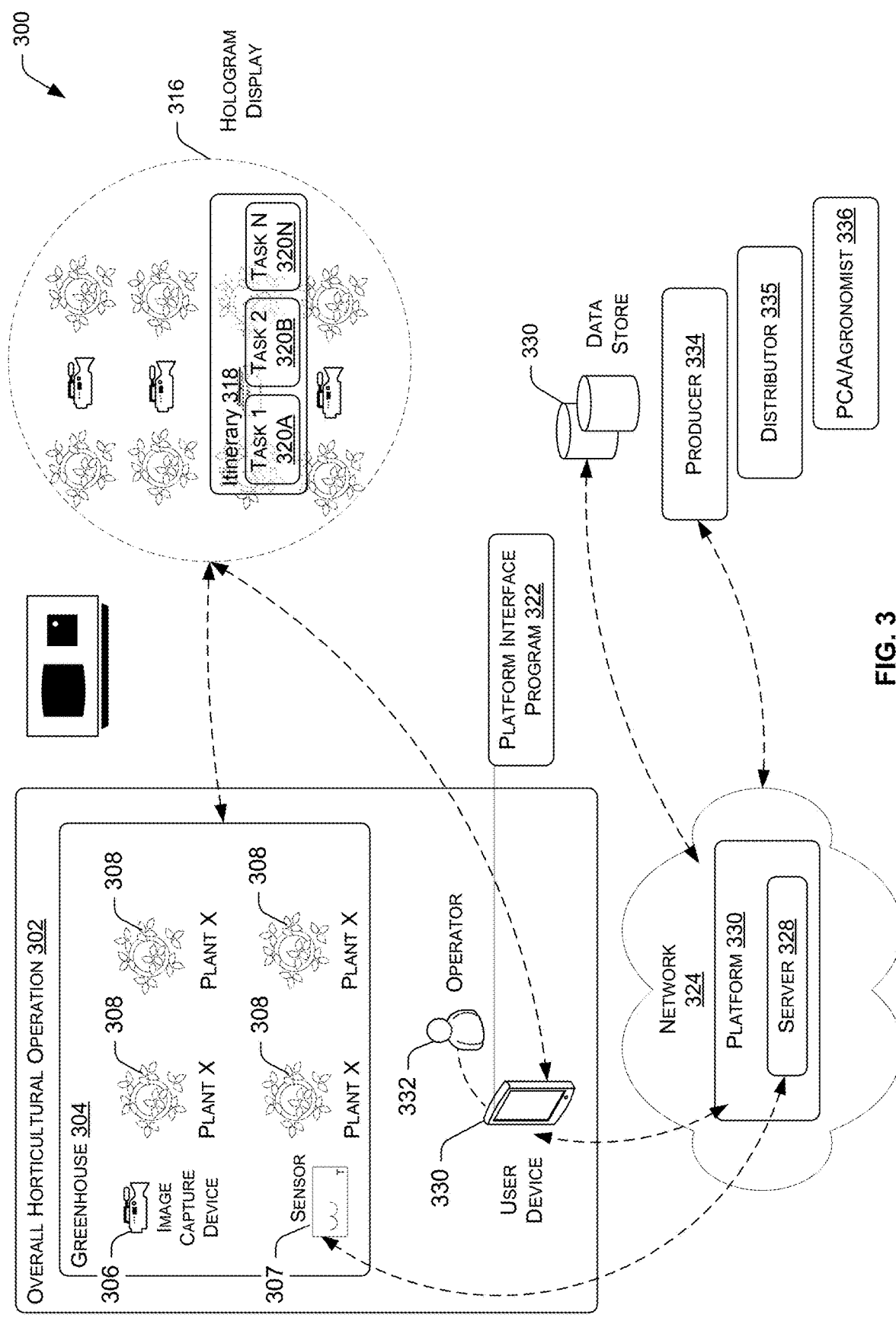
FIG. 3 is a block diagram of an example hardware, software and communications environment for horticultural operation.

Referring to FIG. 3, the image capture device 308 may be part of a larger suite of sensors networked to a data capture function which uploads plant, telemetry, media, and other data such as plant or environmental health status to a server 328 at platform 330 in communication with network 324. For example, sensors may collect telemetry on a per plant or substantially per plant basis. The sampling rate may be high-fidelity and thus an image associated with any event of interest may be available. Without limitation, sensors may include light meters, water meters, potential of hydrogen (pH) acid/alkali meters, and the like. It is noted that any sensor that may be connected to a standard computer input/output interface may be added.

Telemetry may include various types of data, including directly measured data and derived data. For example, a light meter may measure light intensity for that moment of time, and an extrapolation calculation may estimate the daily light integral, which is the total light applied to a plant over a given time period. Telemetry from different sensors may also be combined. For example, a light meter may provide a measurement of the amount of light over time and an oxygen sensor may measure an amount of $O_2$ generated by a plant over time. From these two measurements, the photosynthetic efficiency measurements, such as the relative photosynthesis index may be calculated. Telemetry from sensors may be combined with outside information. For example, a sensor providing telemetry for the amount of vapor in the air may be combined with the water saturation point, to calculate the vapor pressure deficit. The vapor pressure deficit is the difference between the amount of water in the air and the amount of water the air can hold if saturated.

The image capture device 306 may be configured to upload captured images, annotations, and/or other data to the platform 330 (e.g., platform server 328). The platform server 328 can comprise any computing device with a processor, a memory, and a network interface that may participate in a network. The network 324 may be, without limitation, a local area network ("LAN"), a virtual private network ("VPN"), a cellular network, a cloud, the Internet, and/or so forth.

The platform server 328 may be configured to perform image analysis of images of interest in order to recognize images, annotations, and/or other data, automatically detect issues in plants, and detect other issues related to grow operations. In various embodiments, upon receiving an image, the platform server 328 can identify a target, an artifact of the target, and/or an identified issue record within the received image and classify the target, the artifact of the target, and/or the identified issue record to rank and sort the image. Based at least partially on the received image, the platform server 328 can associate the image with an issue record in order to retrieve corresponding recommended courses of action to remediate the detected issue and other relevant data. In this way, for instance, the platform server 328 can assess the health of a plant in a grow operation at an arbitrary time and provide care recommendations to an operator on site. Because historical data has been collected and is available, there is no need to wait for a recommendation. Additionally, the recommendations can be optimized over time. Plants may be marked for continued monitoring to change the recommendations over time. For example, a tobacco mosaic diseased plant may need X1 medicine at time T1, but X2 medicine at time T2. Another example is that a flower may have density D1 of aphids at T1 but D2 at T2. Recommendations can thus be made in a dynamic and time dependent manner.

In various embodiments, the platform server 328 can also associate the image with an issue record in order to retrieve corresponding recommended courses of action previously taken or attempted to remediate other previous issues or the same issue detected. In this way, certain courses of actions can be ruled out if they were previously unsuccessful in remedying the issues or led to subsequent issues. Alternatively, certain courses of actions can be reattempted if they were previously successful in remedying the issues or similar issues.

In various embodiments, the platform server 328 may process image data received by one or more sensors. In doing so, the platform server 328 may identify particular plants 308, identify issues associated with those plants 308, and determine corresponding courses of action.

The platform server 328 may be configured to manage the coordination of information to different users/operators. The platform server 328 makes available the images and results of the image processing analysis to a machine learning engine, to administrative personnel responsible for overseeing the horticultural operation 302, and/or an operator 332, responsible for at least some of the grow operations. Administrative personnel can manually review the state of plants within the horticultural operation 302, identify issues, and direct remedial courses of action to address those identified issues, depending upon embodiments.

In various embodiments, the platform server 328 may create an issue record by performing image processing on an image. Thus, the platform server 328 may be configured to identify issues in plants and other issues related to grow operations based at least partially on received images from an image capture device 308. In addition to identifying issues, the platform server 328 may also store a table of remediation courses of action associated with the issues. In this way, where an issue is associated with an image, a record may be generated and used to query the platform server 328 for at least one remediation course of action. In some cases, the remediation course of action can be a previously attempted remediation course of action or a new remediation course of action. In some embodiments, the platform server 328 may detect when recommendations are different from prior recommendations. It can be determined that in such cases, experimental data may be used to change recommendations for other growers.

In response to an association of an issue with an image and the association of the issue with at least one remediation course of action, the platform server 328 may send a message or a notification comprising a description of the issue (e.g., in a plant) and other information (e.g., related telemetry and/or media, previous attempts/courses of actions to remedy other or same issues, etc.) to a user device 330.

The platform server 328 can also make images and/or annotations available to a platform interface program 322 on demand so users can browse images and/or annotations and create an issue record using, for example, user device 330. In various embodiments, the platform server 328 may interact with producers 334, distributors 335, and PCA/agronomists 336.

The user device 330 may generally be a mobile device or another type of handheld network-enabled electronic device such as a laptop, a tablet computer, and/or a cell phone. As with any computing device, the user device 330 comprises a processor, a memory, and a network interface with analogous characteristics to the servers as described above. The user device 330 may also include an input/output interface such as a touch screen display. The dispatching device comprises 330 software components to receive, analyze, and report status updates or other information, communicate with administrative personnel or devices at producers 334, distributors 335, and PCA/agronomists 336, and analyze and diagnose potential issues in plants and horticultural operations.

The platform server 328 may have access to a data store 330 (e.g., a file server, a network-aware storage, a database, etc.), either integrated or accessible via network such that images and/or annotations can be stored in a database in an image table, issue records can be stored in an issue table, and remediation courses of action can be stored in a solutions table. In a relational database embodiment, a cross-reference table relating images to issues would then store associations of images to issues, and another cross-reference table relating issues to one or more courses of action would store associations of issues to remediation courses of action. Alternatively, images and/or annotations may store a pointer to an issue record and one or more courses of action as part of the image.

Referring again to FIG. 2, in some embodiments the image capture device 208 may work in concert with a lumière feedback device 210. The lumière feedback device 210 provides light on a plant 206 and may be configured to change spectrum and intensity of the light on the plant 206 based on feedback from sensors. One of the sensors may be the image capture device 208 and the analysis of the images captured by the image capture device 208. In some embodiments, the lumière feedback device 210 may incorporate the image capture device 208. Furthermore, the lumière feedback device 210 may be networked. Accordingly, the lumière feedback device 210 may use internal logic to capture images with the image capture device 208 and adjust light spectrum and/or intensity. Alternatively, the lumière feedback device 210 may share images and other information to a central location for further analysis. Upon completion of this analysis, the lumière feedback device 210 may be configured to adjust light spectrum and/or intensity according to a remediation course of action, comprising one or more tasks to address an identified problem, thereby completing a feedback loop.

Where the lumière feedback device 210 is to share images and other information to a central location containing image analysis services 212, the lumière feedback device 210 may either send images directly to those image analysis services 212 or may queue those images in an intermediate server 214 which in turn may subsequently forward those images to the image analysis services 212. The intermediate servers may directly send images to those services 212 if the services 212 are on the same network. Alternatively, the intermediate servers 214, may route images to the image analysis services 212 via the internet and/or cloud services 216. In other embodiments, the image analysis services may be hosted in a virtual machine on the cloud. In some cases, the intermediate server 214 may be on premises, or alternatively, may be hosted off premises.

The image analysis services 212 may comprise a plurality of individual services to perform an analysis workflow on images. Those services may include one or more image reception software components 218 to receive images sent by image capture devices 208, lumière feedback devices 210, intermediate servers 214, or other sources of a grow operation 204.

The one or more image reception software components 218 will then place one or more images in a memory buffer 220 where additional image processing services will be applied. Specifically, one or more image preprocessing software components 222, one or more classification software components 224, one or more analysis software components 226 may be applied to an image in a buffer 220. Once the applications are completed, an image in a buffer 220 may be persisted and aggregated in a data store 228.

The result of the image analysis services 222 is not only to analyze received images, but also to identify problems and to identify potential solutions. Specifically, once received images are analyzed, a course of action for remediation may be identified. Once the image analysis services 222 identifies at least one course of action for remediation, it may interact directly with a grow operation via the image capture device 208, the lumière feedback devices 210, intermediate servers 214, or other interfaces to a grow operation 204.

Alternatively, one or more courses of action for remediation may be transmitted to a master grower 230 responsible for at least one grow operation and/or a line worker 232 who is to perform the actual tasks comprising a course of action for remediation. In one embodiment, all or a portion of the course of action for remediation may be displayed in a horticultural management device 234 for view and interaction by the master grower 230 and/or line worker 232. The horticultural management device 234 may be any networked computer, including mobile tablets over Wi-Fi and/or mobile tablets over a cellular network and/or laptop(s). The horticultural management device 234 may connect to the cloud 216, directly to the image analysis services 222, or directly to the grow operation 204, via intermediate servers 214, lumière feedback devices 210, image capture devices 208, or other interfaces to the grow operation 204.

Figure 4:
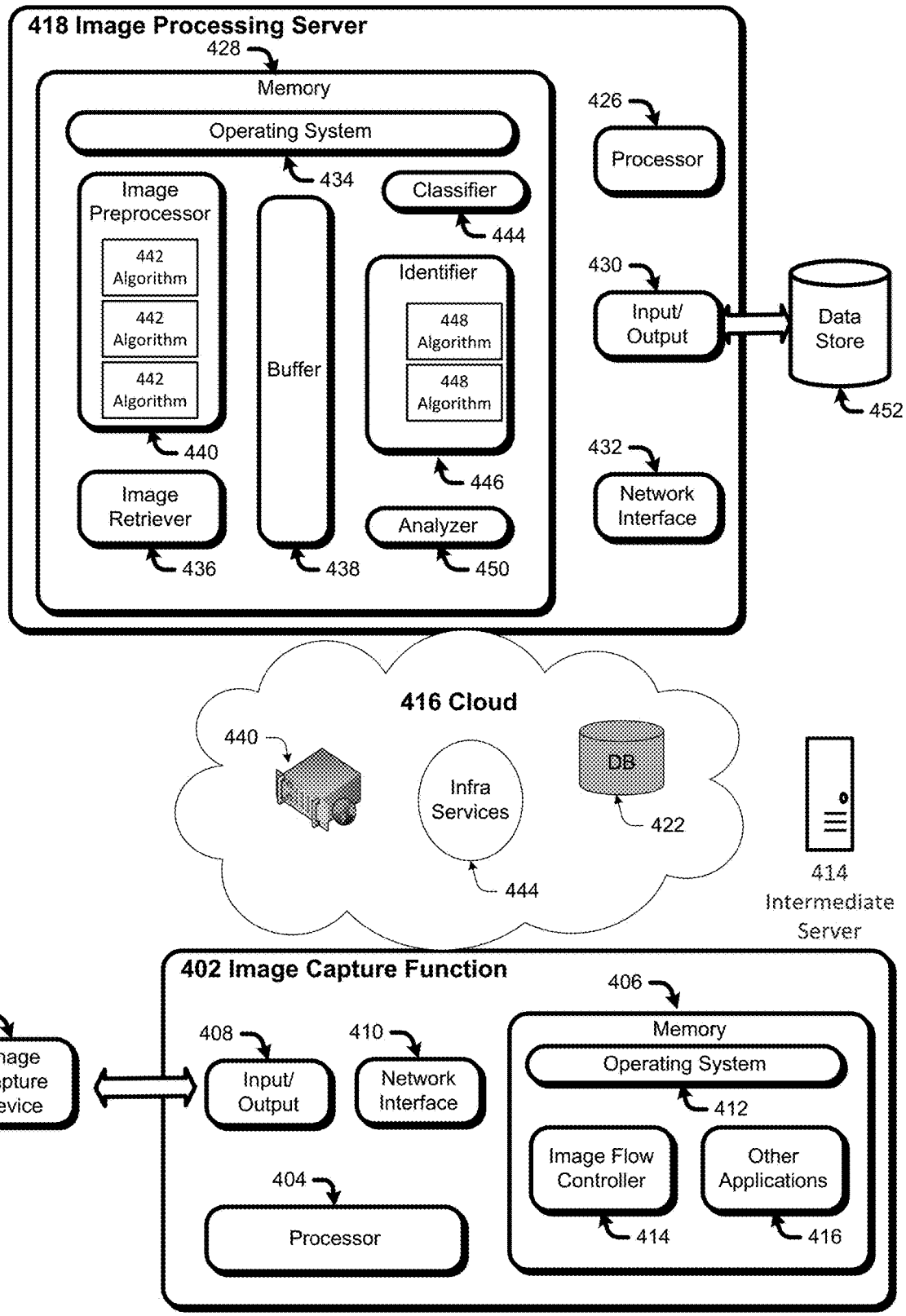
FIG. 4 is a block diagram of an example hardware, software and communications environment for horticultural operation.

FIG. 4 illustrates an embodiment of a hardware, software and communications environment 400. In an embodiment, images are captured via an image capture device 108. Generally, an image capture device 108 may take visible light spectra pictures but may also extend to non-visible spectra such as infrared and ultraviolet. The image capture device 108 may have an on-board application programming interface (API) enabling programmatic control. Alternatively the image capture device 108 may be networked thereby enabling remote control.

Control functions for image capture may be in a separate image capture function 402. The image capture function 402 may incorporate the image capture device 108 and may be part of a larger integrated device, such as a lumière feedback device 310. Indeed, the image capture function 402 may be part of a lumière feedback device 310.

The image capture control function 402 may generally be hosted on a computing device. Exemplary computing devices include without limitation personal computers, laptops, embedded devices, tablet computers, smart phones, and virtual machines. In many cases, computing devices are networked.

The computing device for the image capture control function 402 may have a processor 404, a memory 406. The processor may be a central processing unit, a repurposed graphical processing unit, and/or a dedicated controller such as a microcontroller. The computing device for the image capture control function 402 may further include an input/output (I/O) interface 408, and/or a network interface 410. The I/O interface 408 may be any controller card, such as a universal asynchronous receiver/transmitter (UART) used in conjunction with a standard I/O interface protocol such as RS-432 and/or Universal Serial Bus (USB). The network interface 410, may potentially work in concert with the I/O interface 408 and may be a network interface card supporting Ethernet and/or Wi-Fi and/or any number of other physical and/or datalink protocols.

Memory 406 is any computer-readable media which may store several software components including an operating system 410 and software components such as an image flow controller 414 and/or other applications 416. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

In an embodiment, image flow controller 414 is a software component responsible for managing the capture of images, receiving images from the image capture device 108 (if not integrated with the image capture function 402), the local management of received images, and potentially the transmission of received images off the image capture function 402 over a network. The image flow controller 414 may store a configuration setting of how many images an image capture device 108 is to capture, the resolution the image is to be captured, the format the image is to be stored, and any other processing to be performed on the image. The image flow controller 414 may store a captured and/or received image into a buffer in the memory 406 and name the filename of the received image. Other applications 416 may be utilities to perform image processing, such as compression and/or encryption.

The image flow controller 414 may also manage the transmission of received images. Specifically, it may transmit an image to a known network location via the network interface 410. The known network locations may include an intermediate server 314, an internet and/or cloud location 316 or an image processing server 418.

Upon transmission, the image flow controller 414 may enlist in notifications to determine that the transmission was successful. The image flow controller 414 may also transmit notifications to other device subscribing to its notifications indicating status of a transmission.

The image capture function 402 may communicate to an intermediate server 314. The intermediate server 314 is any computing device that may participate in a network. The network may be, without limitation, a local area network ("LAN"), a virtual private network ("VPN"), a cellular network, or the Internet. The intermediate server 414 is similar to the host computer for the image capture function. Specifically, it will include a processor, a memory, an input/output interface and/or a network interface. In the memory will be an operating system and software components to route images. The role of the intermediate server 414 is to forward images received from the image capture functions 402 and to forward directly, if on the same network, to an image processing server 418, or via the internet and/or cloud 316. In some embodiments, the intermediate server may act as intermediate storage for images.

A service on the cloud 316 may provide the services of an intermediate server 414, or alternatively may host the image processing server 418. A server, either intermediate 414, or for image processing 418, may either be a physical dedicated server or may be a virtual machine. In the latter case, the cloud 418 may represent a plurality of disaggregated servers which provide virtual application server 440 functionality and virtual storage/database 422 functionality. The disaggregated servers are physical computer servers, which may have a processor, a memory, an I/O interface and/or a network interface. The features and variations of the processor, the memory, the I/O interface and the network interface are substantially similar to those described for the host of the image capture function 402, and the intermediate server 414. Differences may be where the disaggregated servers are optimized for throughput and/or for disaggregation.

Cloud 418 services 440 and 422 may be made accessible via an integrated cloud infrastructure 444. Cloud infrastructure 444 not only provides access to cloud services 440 and 422 but also to billing services and other monetization services. Cloud infrastructure 444 may provide additional service abstractions such as Platform as a Service ("PAAS"), Infrastructure as a Service ("IAAS"), and Software as a Service ("SAAS").

The image processing server 418, is generally a computer server or on a virtual machine. Where the image processing server 418 is a physical computer server, it may have a processor 426, a memory 428, an I/O interface 430 and/or a network interface 432. The features and variations of the processor 426, the memory 428, the I/O interface 430 and the network interface 432 are substantially similar to those described for the host of the image capture function 402, and the intermediate server 314.

The memory 428 of the image processing server 418, will store an operating system 434 and a set of software components to perform image analysis services 312. Those software components may include, an image retriever software component 436, an image buffer in memory 438, an image preprocessor software component 440 which may further include one or more image preprocessing algorithms 442, a classifier software component 444, an identifier software component 446 which may further include one or more identifier algorithms 448, and an analyzer software component 450.

The image retriever software component 436 manages the receiving of images from image capture functions 402. The throughput of images and supplementary data may differ. Accordingly, the image retriever software component 436 may manage the timing, speed, and the party controlling the data transfer. For example, it may act as a simple store, which receives and stores images upon receipt as pushed by an image capture function 402. Alternatively, it may affirmatively pull images for image capture functions.

One example of a pull scenario is where an image processing server 418 is first joining the network. When this happens, one or more image capture functions 402 could potentially overload the image processing server 418 by sending a large number of images. To prevent overload, the image retriever software component 436 will negotiate a controlled transfer with the one or more image capture functions 402. An example of negotiated controlled transfer is described with respect to FIG. 4.

When an image retriever software component receives an image 436, it may store the received image in an image buffer 438. An image buffer 438 is dedicated memory, generally part of the memory 428, where a retrieved image may reside to be processed. Common image buffers are contiguous dedicated RAM, where the data comprising an image may be accessed directly rather than via a series of central processing unit commands. Generally such a configuration is via a Graphical Processing Unit.

Once an image is in the buffer 438, the image may be subjected to one or more image processing and analysis operations. An image preprocessor software component 440 performs any transformations to an image enable analysis to increase the likelihood of successful analysis. Example operations to enable analysis are to decompress and/or decrypt incoming images via the respective decompression and/or decryption algorithms 442. Example operations to increase the likelihood of successful analysis is to apply one or more transformations and/or content analysis algorithms 442 are Gaussian blur and Red-Green-Blue (RGB) content analysis. The aforementioned algorithms 442 as well as other algorithms 442 applied by the image preprocessor software component 440 are described in further detail with respect to FIG. 4.

Generally, analysis is performed later in the image workflow of the image processing server 418. Where possible, algorithms 442 attempt to take partial images, corrupt images, or otherwise substandard images and apply corrections sufficient to support analysis. However, the image preprocessing software component 440 may also contain logic to remove images with insufficient information or quality from the workflow. In this way, data collected during subsequent analysis will not contain data from corrupt or misleading images. This cleaning logic may be part of the image processing software component 440 or alternatively may be in a separate image cleaning software component.

Once preprocessing is complete, the classifier software component 444 is configured to identify which portions of an image represent the plant to be analyzed as opposed to portions of the image representing items other than the plant to be analyzed. The classifier software component 444 identifies discrete objects within the received image and classifies those objects by a size and image values, either separately or in combination. Example image values include inertia ratio, contour area, and Red-Green-Blue components. Based on those values, the objects are ranked and sorted. Items above a predetermined threshold, or the highest N objects, are selected as portions of the received image representing the plant. The classifier software component 444 is described in further detail with respect to FIG. 4.

After classification, an identifier software component 446 is configured to identify the plant in the received image and to identify artifacts in the plant. This involves comparing the image data of the plant in the received image to that of other images. In order to perform those comparisons, the identifier software component 446 may create a plant state vector comprised of values and value sets generated by one or more algorithms 448 of the identifier software component 446. Such a constructed vector corresponds to the state of a plant in an image and is compared against other plant state vectors to perform general comparisons as well as sequential analysis.

The identifier software component 446 contains several identification algorithms 448. Some algorithms 448 work directly on a single image. Other algorithms 448 may process a series of images classified together into a category, collect information in common, and apply to subsequent images. Example categories may be images of the same plant over time, images of the same genus and species of plant, and images of plants given the same care.

One example of the latter case is where the identifier software component 446 collects color histogram data over a plurality of images of the same category and generates an average histogram comprised of the averages or weighted averages of each distribution variable comprising the histogram. Accordingly, when an image is received belonging to the same category, the identifier software component 446 may use the average histogram to identify the plant and artifacts in the plant. The average histogram is then recalculated using the histogram of the incoming image. In this way, the average histogram becomes an adaptive histogram with improving performance. In some embodiments, the logic to perform analysis using data from a plurality of images, or performing computationally intense logic, may be separated from the identifier software component 446 into another software component such as an edge cleaner software component.

In some embodiments, deep-learning/machine learning can be used to encode qualities of interest of a plant into the plant state vector.

As previously mentioned, transforming a raw received image into a state that can be analyzed is only part of the function of the image processing server 418. Another function is the analysis of the transformed image. The analyzer software component 450 takes the transformed image, and potentially any generated additional information, such as a plant state vector, and maps portions of the image to indicia corresponding to a feature of a plant. An indicium (of the indicia) is called an artifact. Because the classifier software component 444 identified objects comprising portions of a plant, those portions may be subjected to analysis of visual information. Because the identifier software component 446 may have generated branch information about plant branches, leaf structure, and root structure, branch analysis may identify not only artifacts but artifacts indicating issues in the plant.

If at least one artifact corresponds to an issue with a plant, the analyzer software component 450 may also retrieve corresponding recommended courses of action to remediate the issue. Such information may be subsequently sent to the grow operation 104, intermediate server 314, lumière feedback device 310, image capture device 108, and or other entry points into the grow operation 104.

The image processing server 418 may have access to a data store 452, either integrated (not shown) or accessible via network. The image processing server may store raw images, transformed images, generated plant state vectors, and other related information for archival and/or reporting after processing is complete. The data store 452 may be configured as a relational database, an object-oriented database, a NoSQL database, and/or a columnar database, or any configuration to support scalable persistence.

Reporting may be performed by a querying software component (not shown). Because each image is associated with a plant, date/time stamp, plant state vector, and potentially identified issues, images may be queried by any or all of these data values.

The disclosed embodiments provide infrastructure capable of collecting image and other information on a per plant basis, applying sophisticated image analysis, applying sophisticated horticultural analysis to diagnose problems and recommend a remedial course of action, all while distributing the relevant information to workers and or devices in the grow operation.

Figure 5:
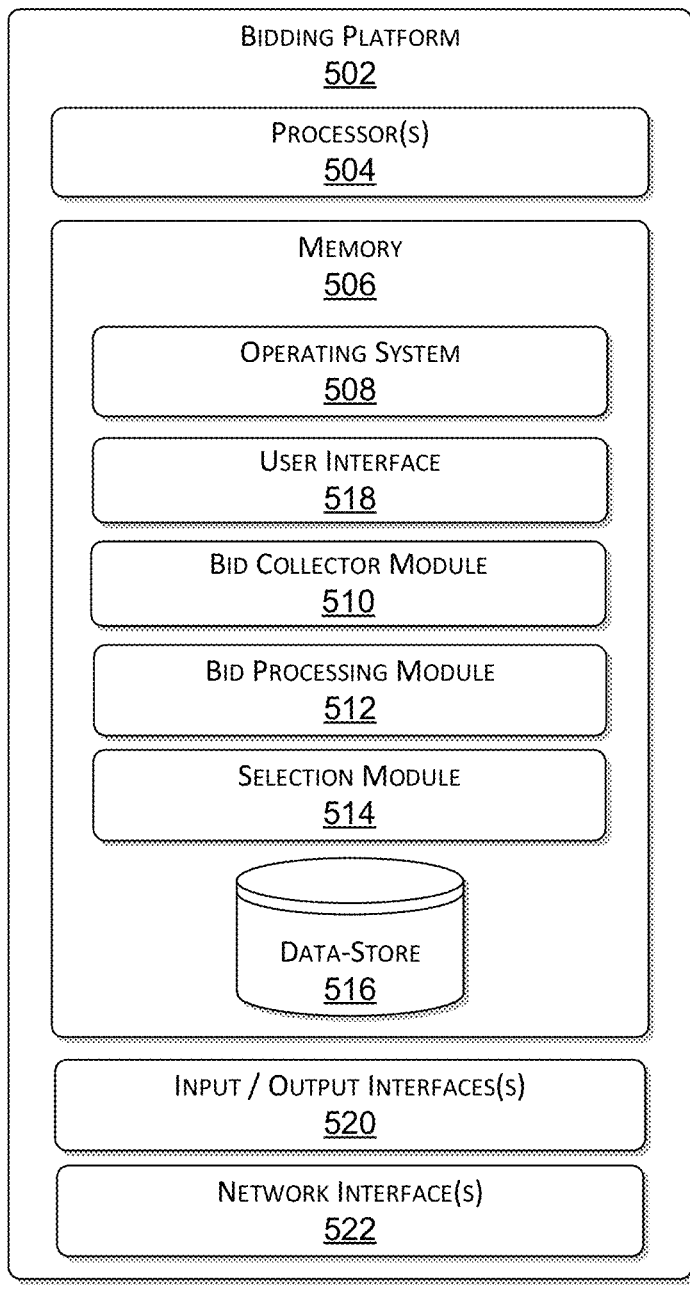
FIG. 5 is a block diagram of an example system for horticultural operation.

FIG. 5 illustrates a block diagram of a bidding platform 502 that may implement a bidding function based on bidding input received from various parties. In doing so, the bidding platform 502 may facilitate the receipt and processing of bids for agricultural products and/or services based on input from suppliers such as distributors and producers. The bidding platform 502 may correspond to at least a part of platform 310. In the illustrated example, the bidding platform 502 may include one or more processor(s) 504 operably connected to memory 506.

In the illustrated example, the memory 506 may include an operating system 508, a bid collection module 510, a bid processing module 512, a selection module 514, a data-store 516, and a user interface 518. The operating system 508 may be any operating system capable of managing computer hardware and software resources.

In the illustrated example, the bid collection module 510 may aggregate the bids received from various parties to generate input for the processing and selection process. The bid data may include bids for products and services that were recommended by platform 310.

In the illustrated example, the bid processing module 512 may generate a proposal using, as input, the data from the bid collection module 510. In the illustrated example, the data-store 516 may store accumulated bid and selection data for transactions facilitated by the platform.

In the illustrated example, the user interface 518 may be configured to display notifications that alert suppliers and consumer plant growers of the progress of a bid.

In various examples, the user interface 518 may provide a means for a plant grower to receive bids. In some examples, the user interface 518 may also provide a means for a plant grower to request and select bids for plant growth scripts from merchants via the script offering system. The user interface 518 may also allow plant growers to specify underlying conditions that solicited bids must meet. In a non-limiting example, the underlying conditions may include a minimum satisfaction rating of a merchant, or a request for one or more products pertaining to particular plant species.

The bid collector module 510, bid processing module 512, bid selection module 514, or other components of the bidding platform 302 may store background information (name, location, account number, login name, passwords, tax identification number, among other information) for participants of the bidding platform. The bidding platform 502 may also contain hyperlinks to third-party payers that allows growers to fund payment for a selected bid. The bidding platform 502 may contain various other modules not shown, such as, a service provider module that allows the bidding platform 502 to generate producer and distributor lists and other information.

When a grower receives a recommendation for a product or service, the bidding platform 502 may initiate the bidding process, set the process parameters, such as a suggested price and duration. After the bidding has completed, the bidding platform 502 may responds to a query as to whether the grower has selected a bid. If the grower has selected a bid, then the grower may be provided access to payment and delivery options.

In the illustrated example, the bidding platform 502 may include input/output interface(s) 520 and network interface (s) 522.

Figure 6:
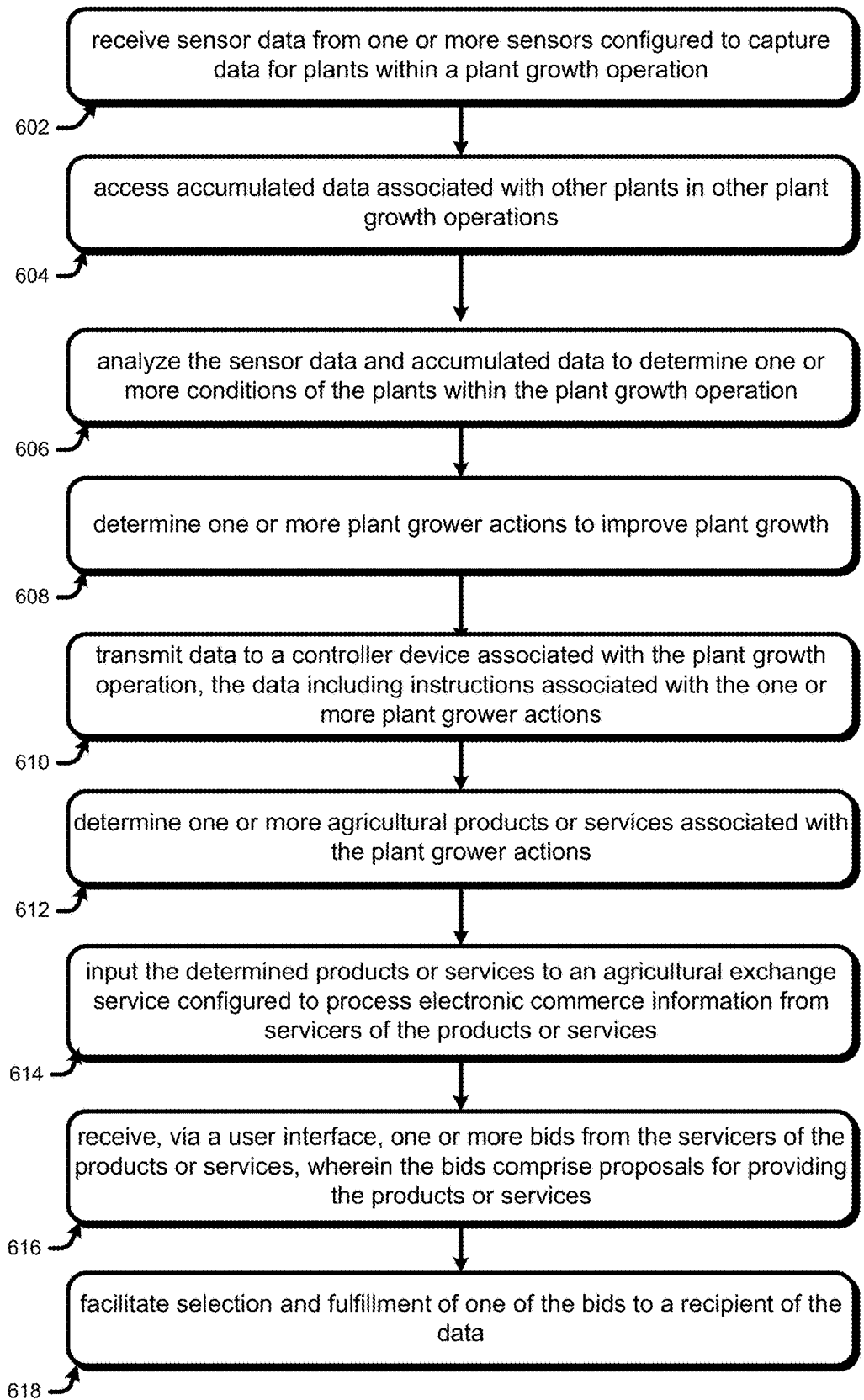
FIG. 6 is a flow diagram showing aspects of an illustrative routine, according to one embodiment disclosed herein.

FIG. 6 is a diagram illustrating aspects of a routine 600 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 600 begins at operation 602, which illustrates receiving sensor data from one or more sensors configured to capture data for plants within a plant growth operation.

The routine 600 then proceeds to operation 604, which illustrates accessing accumulated data associated with other plants in other plant growth operations.

Operation 606 illustrates analyzing the sensor data and accumulated data to determine one or more conditions of the plants within the plant growth operation.

Operation 608 illustrates, based on the analysis, determining one or more plant grower actions to improve plant growth.

Operation 610 illustrates transmitting data to a controller device associated with the plant growth operation, the data including instructions associated with the one or more plant grower actions.

Operation 612 illustrates determining one or more agricultural products or services associated with the plant grower actions.

Operation 614 illustrates inputting the determined products or services to an agricultural exchange service configured to process electronic commerce information from servicers of the products or services.

Operation 616 illustrates receiving, via a user interface, one or more bids from the servicers of the products or services, wherein the bids comprise proposals for providing the products or services.

Operation 618 illustrates facilitating selection and fulfillment of one of the bids to a recipient of the data.

In an embodiment, a closed loop function configured to generate likely candidates for diagnoses and recommendation is executed.

In an embodiment, measured effects of products or services on plants are determined.

In an embodiment, a grading or quality assessment of the agricultural products or services is provide for an issue identified by an agricultural machine learning model.

In an embodiment, the sensor data includes image data that is captured continuously, based on a time lapse sequence, or based on a triggering event.

In an embodiment, the triggering event may include a change in a relative position of an individual plant with its surrounds, based on an analysis of temporally sequential image data, or an indication that an environmental datapoint has fallen below a predetermined threshold.

In an embodiment, the one or more sensors include environmental sensors or image capturing devices, wherein the environmental sensors including at least one of range-finding sensors, light intensity sensors, light spectrum sensors, non-contact infra-red temperature sensors, thermal sensors, photoelectric sensors that detect changes in color, carbon dioxide uptake sensors, water, pH testing, and oxygen production sensors.

In an embodiment, the image capturing devices are capable of capturing hyperspectral images, 3D measurements, RGB, monochrome, or thermal images.

In an embodiment, the servicers of the products or services include one or more of agricultural producers, agricultural distributors, or PCA/agronomists.

In an embodiment, the agricultural exchange service is further configured to transmit information pertaining to the one or more agricultural products or services associated with the plant grower actions to subscribers of the agricultural exchange service and to an interface for users of the agricultural exchange service.

In an embodiment, the agricultural exchange service is further configured to transmit information pertaining to the one or more agricultural products or services associated with the plant grower actions to an interface for users of the agricultural exchange service.

In an embodiment, the agricultural exchange service is further configured to transmit information pertaining to the one or more agricultural products or services associated with the plant grower actions to subscribers of the agricultural exchange service and to an interface for users of the agricultural exchange service In an embodiment, data indicative of a selection of the one or more bids is received via the user interface.

In an embodiment, the agricultural exchange service is further configured to receive, via the interface, additional information pertaining to the plant growth operation.

In an embodiment, the one or more plant grower actions are further determined based on the additional information.

In an embodiment, the agricultural exchange service is further configured to receive, via the interface, additional information pertaining to the plant growth operation; and the one or more plant grower actions are further determined based on the additional information.

In an embodiment, a plurality of configurations are presented to the user with the feature data including configurations with selling data and discounting data.

Figure 7:
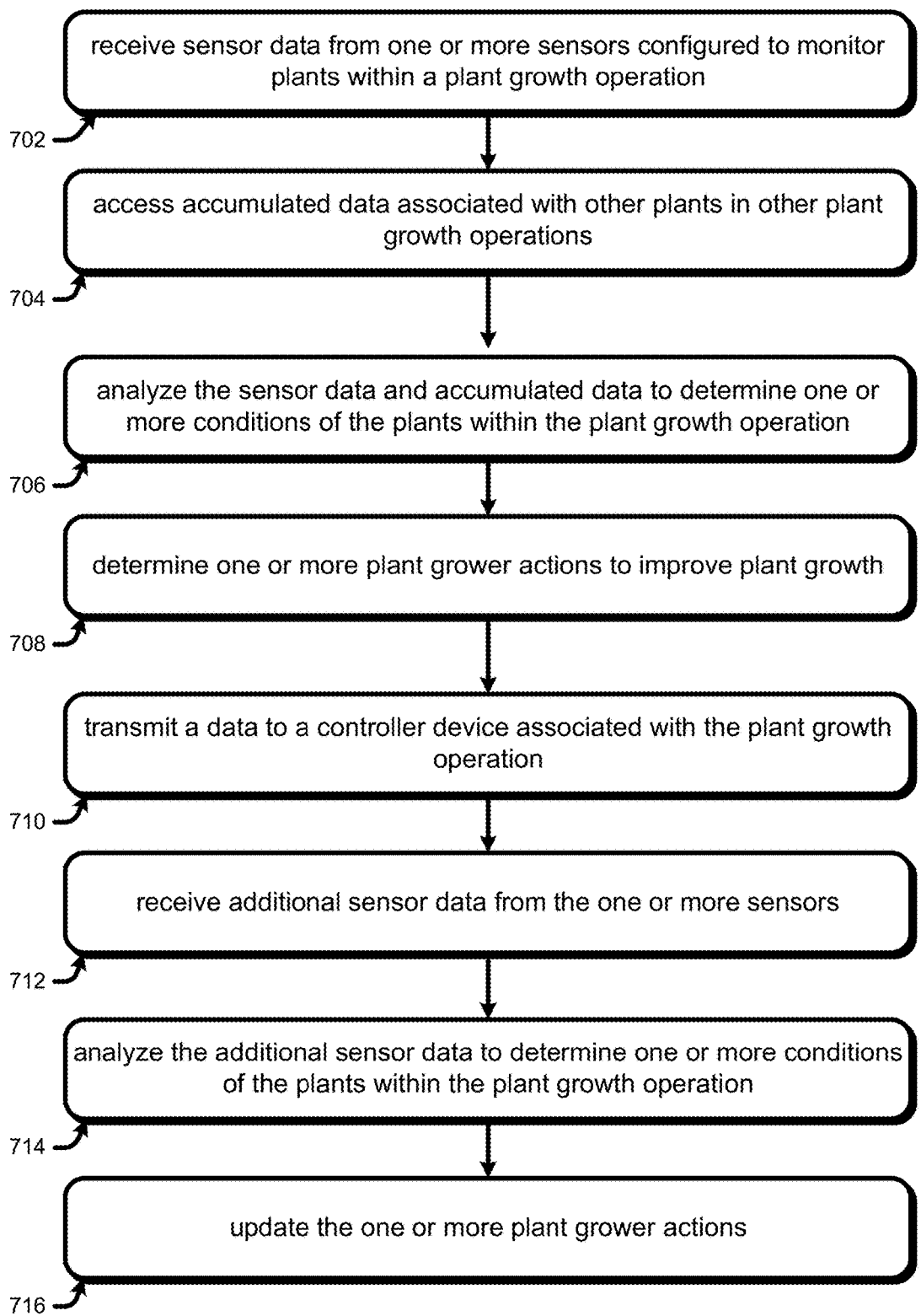
FIG. 7 is a flow diagram showing aspects of an illustrative routine, according to one embodiment disclosed herein.

In an embodiment, the determine one or more plant grower actions is performed by a machine learning component FIG. 7 is a diagram illustrating aspects of a routine 700 for implementing some of the techniques disclosed herein.

The routine 700 begins at operation 702, which illustrates receiving sensor data from one or more sensors configured to monitor plants within a planning growth operation.

The routine 700 then proceeds to operation 704, which illustrates accessing accumulated data associated with other plants in other plant growth operations.

Operation 707 illustrates analyzing the sensor data and accumulated data to determine one or more conditions of the plants within the plant growth operation.

Operation 708 illustrates based on the analysis, determining one or more plant grower actions to improve plant growth.

Operation 710 illustrates transmitting data to a controller device associated with the plant growth operation. In an embodiment, the data includes instructions associated with the one or more plant grower actions. In an embodiment, the data is operable to automatically control the controller device to execute the instructions.

Operation 712 illustrates receiving additional sensor data from the one or more sensors.

Operation 714 illustrates analyzing the additional sensor data to determine one or more conditions of the plants within the plant growth operation.

Operation 716 illustrates based on the analysis of the additional sensor data, updating the one or more plant grower actions.

In an embodiment, the one or more plant grower actions include at least one of changing a light intensity or a light spectrum of existing lighting within the plant growth operation, changing an amount of water or a frequency of a watering operation with the plant growth operation, changing an amount of nutrients or fertilizer used with the plant growth operation, or changing a ratio of nutrients to fertilizer that is used within the plant growth operation.

In an embodiment, the agricultural exchange service is further configured to transmit information pertaining to the one or more agricultural products or services associated with the plant grower actions to an interface for users of the agricultural exchange service.

In an embodiment, a progress metric of the plant growth operation is determined.

In an embodiment, the progress metric is indicative of progress of the plant growth operation relative to predicted milestones.

In an embodiment, it is determined that the controller device is configured to automate at least one plant grower action of the one or more plant grower actions. In an embodiment, the data transmitted to the controller devices includes computational instructions that cause the controller device to automate the at least one plant grower action within the plant growth operation.

In an embodiment, user data is transmitted to a user device associated with a plant grower of the plant growth operation, the user data indicative of the one or more plant grower actions.

In an embodiment, the analyzing of the additional sensor data comprises determining that at least one plant is experiencing a less than optimal plant growth, based at least in part on the progress metric.

In an embodiment, the updating of the one or more plant grower actions comprises generating one or more actions to optimize plant growth of the at least one plant.

Figure 8:
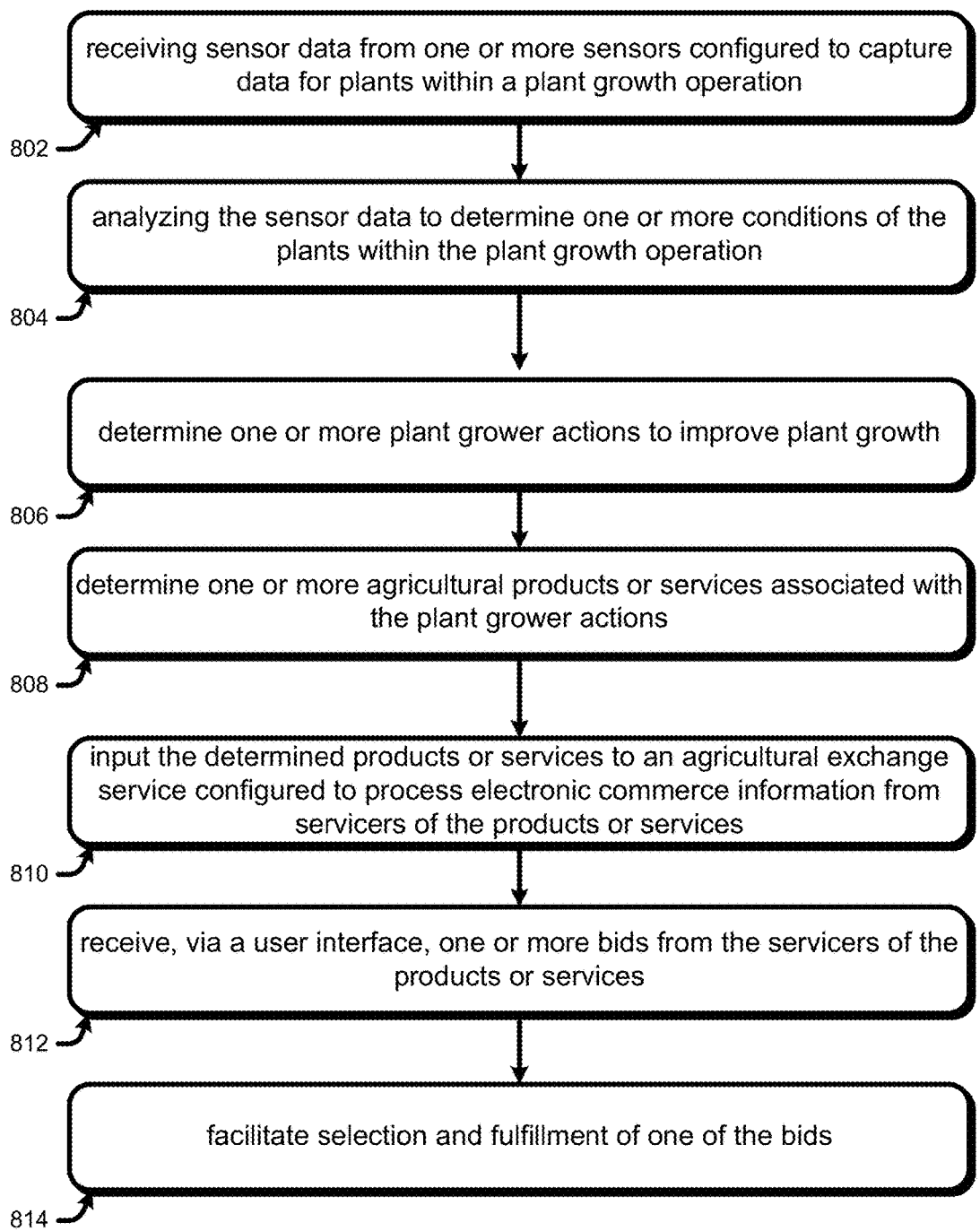
FIG. 8 is a flow diagram showing aspects of an illustrative routine, according to one embodiment disclosed herein.

FIG. 8 is a diagram illustrating aspects of a routine 800 for implementing some of the techniques disclosed herein.

The routine 800 begins at operation 802, which illustrates receiving sensor data from one or more sensors configured to capture data for plants within a plant growth operation.

The routine 800 then proceeds to operation 804, which illustrates analyzing the sensor data to determine one or more conditions of the plants within the plant growth operation.

Operation 808 illustrates, based on the analysis, determining one or more plant grower actions to improve plant growth.

Operation 808 illustrates determining one or more agricultural products or services associated with the plant grower actions.

Operation 810 illustrates inputting the determined products or services to an agricultural exchange service configured to process electronic commerce information from servicers of the products or services.

Operation 812 illustrates receiving, via a user interface, one or more bids from the servicers of the products or services.

Operation 814 illustrates facilitating selection and fulfillment of one of the bids.

In an embodiment, a request is sent to solicit bids for the one or more agricultural products or services;

In an embodiment, at least a first bid is received for a first product or service and a second bid for a second product or service; and In an embodiment, the first or second bid is selected based at least in part on a selection associated with the plant growth operation.

In an embodiment, the request to solicit offers includes at least a part of the sensor data.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
one or more processors; and
memory communicatively coupled to the one or more processors, the memory storing computer-readable instructions that are executable by the one or more processors to cause the system to, at least:
receive, from one or more sensor devices that include an image capture device, a water sensor, a plant health sensor, or a light sensor and that are configured to capture data for plants within a plant growth operation, sensor data, wherein the image capture device (i) is configured to capture visible light spectra images or non-visible spectra images or both and (ii) includes an on-board application programming interface or is networked to enable remote control, and wherein the water sensor is configured to monitor water flow or water uptake;
access accumulated data that includes historical sensor data obtained in association with other plants outside of the plant growth operation;
analyze the sensor data and the accumulated data to determine one or more conditions of the plants within the plant growth operation, the one or more conditions based at least in part on the accumulated data and the sensor data;
based on the analysis, determine one or more plant grower actions to improve the plant growth operation;
determine a horticultural recipe including instructions associated with the one or more plant grower actions, the instructions capable of causing one or more controller devices to facilitate the one or more plant grower actions; and
provide the horticultural recipe to an online marketplace for use by a plurality of plant growth operations.

2. The system of claim 1, further comprising computer-readable instructions that are executable by the one or more processors to cause the system to execute a closed loop function configured to generate likely candidates for diagnoses and recommendation.

3. The system of claim 1, further comprising computer-readable instructions that are executable by the one or more processors to cause the system to determine measured effects of products or services on plants.

4. The system of claim 1, further comprising computer-readable instructions that are executable by the one or more processors to cause the system to provide a grading or quality assessment of the agricultural products or services for an issue identified by an agricultural machine learning model.

5. The system of claim 1, wherein the sensor data includes image data that is high-fidelity data that is captured continuously, based on a time lapse sequence, or based on a triggering event.

6. The system of claim 5, wherein the triggering event may include a change in a relative position of an individual plant with its surrounds, based on an analysis of temporally sequential image data, or an indication that an environmental data-point has fallen below a predetermined threshold.

7. The system of claim 1, wherein the one or more sensors further include environmental sensors that include at least one of range-finding sensors, light intensity sensors, light spectrum sensors, non-contact infra-red temperature sensors, thermal sensors, photoelectric sensors that detect changes in color, carbon dioxide uptake sensors, pH sensors, and oxygen production sensors.

8. The system of claim 7, wherein the image capturing device is further capable of capturing hyperspectral images, 3D measurements, RGB images, monochrome images, or thermal images.

9. The system of claim 1, wherein the servicers of the products or services include one or more of agricultural producers, agricultural distributors, or PCA/agronomists.

10. The system of claim 1, wherein the agricultural exchange service is further configured to transmit information pertaining to the one or more agricultural products or services associated with the plant grower actions to subscribers of the agricultural exchange service and to an interface for users of the agricultural exchange service.

11. The system of claim 1, wherein the horticultural recipe further includes identification of horticultural products or services to facilitate the one or more plant grower actions.

12. The system of claim 1, wherein the horticultural recipe further includes data to facilitate recommendations by the online marketplace.

13. The system of claim 1, wherein an updated to the horticultural recipe is provided based at least in part on additional sensor data from the one or more sensors of the plant growth operation.

14. A computer implemented method, comprising:
receiving, from one or more sensor devices that include an image capture device, a water sensor, a plant health sensor, or a light sensor and that are configured to capture data for plants within a plant growth operation, sensor data, wherein the image capture device (i) is configured to capture visible light spectra images or non-visible spectra images or both and (ii) includes an on-board application programming interface or is networked to enable remote control, and wherein the water sensor is configured to monitor water flow or water uptake;
accessing accumulated data that includes historical sensor data obtained in association with other plants outside of the plant growth operation;
analyzing the sensor data and the accumulated data to determine one or more conditions of the plants within the plant growth operation, the one or more conditions based at least in part on the accumulated data and the sensor data;
based on the analyzing, determining one or more plant grower actions to improve the plant growth operation;
determining a horticultural recipe including instructions associated with the one or more plant grower actions, the instructions capable of causing one or more controller devices to facilitate the one or more plant grower actions; and
providing the horticultural recipe to an online marketplace for use by a plurality of plant growth operations.

15. The method of claim 14, further comprising:
executing a closed loop function configured to generate likely candidates for diagnoses and recommendation.

16. The method of claim 14, further comprising:
determining measured effects of products or services on plants.

17. The method of claim 14, further comprising:
providing a grading or quality assessment of the agricultural products or services for an issue identified by an agricultural machine learning model.

18. The method of claim 14, wherein the sensor data includes image data that is high-fidelity data that is captured continuously, based on a time lapse sequence, or based on a triggering event.

19. The method of claim 14, wherein the one or more sensors further include environmental sensors that include at least one of range-finding sensors, light intensity sensors, light spectrum sensors, non-contact infra-red temperature sensors, thermal sensors, photoelectric sensors that detect changes in color, carbon dioxide uptake sensors, pH sensors, and oxygen production sensors.

20. One or more non-transitory computer-readable media of a computing device storing computer-executable instructions that upon execution cause one or more processors to perform acts comprising:
receiving, from one or more sensor devices that include an image capture device, a water sensor, a plant health sensor, or a light sensor and that are configured to capture data for plants within a plant growth operation, sensor data, wherein the image capture device (i) is configured to capture visible light spectra images or non-visible spectra images or both and (ii) includes an on-board application programming interface or is networked to enable remote control, and wherein the water sensor is configured to monitor water flow or water uptake;
accessing accumulated data that includes historical sensor data obtained in association with other plants outside of the plant growth operation;
analyzing the sensor data and the accumulated data to determine one or more conditions of the plants within the plant growth operation, the one or more conditions based at least in part on the accumulated data and the sensor data;
based on the analyzing, determining one or more plant grower actions to improve the plant growth operation;
determining a horticultural recipe including instructions associated with the one or more plant grower actions, the instructions capable of causing one or more controller devices to facilitate the one or more plant grower actions; and
providing the horticultural recipe to an online marketplace for use by a plurality of plant growth operations.

* * * * *